UNITED STATES PATENT OFFICE.

JACOB STEPP, OF SOMERVILLE, MASSACHUSETTS, ASSIGNOR TO COLLEGE POINT RUBBER COMPANY, (LIMITED,) OF COLLEGE POINT, N. Y.

IMPROVEMENT IN THE MODES OF COVERING WOODEN AND OTHER ARTICLES WITH INDIA-RUBBER.

Specification forming part of Letters Patent No. 219,033, dated August 26, 1879; application filed October 15, 1878.

*To all whom it may concern:*

Be it known that I, JACOB STEPP, of Somerville, in the county of Middlesex and State of Massachusetts, have invented a new Mode of Covering Wooden and other Articles with India-Rubber, of which the following is a specification.

The object of my invention is to provide wooden articles, or articles made of other suitable material, with a firmly-adhering covering of soft or hard india-rubber, such covering to be of any desired thickness without regard to the shape of the article.

It is often desirable that an article made of wood or metal should not be affected by water, acids, or other chemicals; or it may be required to give a fine polished surface to such an article. To accomplish this effectually is the object of my invention.

No drawings are required to illustrate my invention. Therefore I will describe its operation, and select for that purpose a wooden box, which is to be provided with a firmly-adhering covering of hard india-rubber, so as to make it capable of containing acids, oils, or other chemicals just as well as if made of one piece of hard rubber.

Operation: The box, if made of wood, must be of well-seasoned and dry material. It is just coated by means of a brush with a solution of india-rubber in benzine. This coating gives an adhesive surface to the box. After this I take unvulcanized india-rubber (of such composition as is used for making hard rubber) rolled out in a smooth sheet—say, one-sixteenth of an inch thick. Cut such sheet into suitable pieces to lay over and fit the box inside and outside. The laying on of the rubber must be done with care, so that no air will be confined between the sheet of rubber and the wood. Care is also required that all the joints which may occur in laying on the different pieces of rubber are perfectly united, which is done by manipulation and pressure with the hand.

When the box is perfectly covered all over it is placed in a vulcanizing-vessel, such as described in Letters Patent No. 178,432, dated June 6, 1876. The vulcanizing of the rubber on the box is done while under pressure through the medium of water, in the manner and on the principles as described in said Letter Patent for the purpose of vulcanizing elastic rubber patterns.

The time and temperature necessary for vulcanizing the rubber are well known by those skilled in that science.

When the rubber covering is vulcanized the box is removed from the vulcanizing-vessel, and it has then a firmly-adhering cover of hard rubber.

The pressure applied through the medium of water forces the rubber into the pores of the wood while in the plastic state. It further prevents blistering or formation of bubbles in the rubber covering, which will occur if vulcanized without the pressure. The rubber covering vulcanized under the water-pressure causes the rubber to adhere so firmly to the wood that it cannot be parted from it without taking part of the wood with it.

If a metallic article is thus covered the rubber covering lies very firmly to the metal, but does not adhere as securely as on wood.

It has often been attempted to cover articles of wood or other material with a layer of rubber, but with little success, especially so if the article was of irregular shape. The rubber must be held in close contact with the article to be covered during the whole process of vulcanizing. If this is not the case large blisters will be formed between the rubber and the article to be covered, making a rubber covering worthless.

This very important object of applying a uniform and equal pressure to every part of the article to be covered, no matter how irregular the shape of the article may be, is accomplished perfectly by the application of pressure through the medium of water. The water surrounding the whole article to be covered has the great advantage to follow with uniform pressure any shape of the article, no matter how irregular the surface may be.

An endless variety of useful articles can be produced by being covered with a firm and adhering layer of soft or hard rubber. The application of such a covering is simple after this description, and remains in principle the same for any article.

I wish to have it understood that I do not claim in its broad sense the application of pressure through the medium of water while vulcanizing my rubber covering; but

What I claim as new, and desire to secure by Letters Patent, is—

The process herein described for coating wooden or other articles with india-rubber or other vulcanizable gum—that is to say, by first applying gum in solution, then covering the article with a vulcanizable compound in sheet or fragments, and subsequently subjecting the article thus covered to liquid pressure during the process of vulcanization.

JACOB STEPP.

Witnesses:
   ALEXR. WOOD,
   JOHN J. C. SMITH.